Inventors
Donald P. Dunlop
Raymond W. Cousins
By Cushman, Darby & Cushman
Attorneys Inventors
Donald P. Dunlop
Raymond W. Cousins
By Cushman, Darby & Cushman
Attorneys

United States Patent Office 3,272,226
Patented Sept. 13, 1966

3,272,226
ANTI-SIMMER DEVICE FOR RELIEF VALVES
Donald P. Dunlop, Weston, Ontario, and Raymond W. Cousins, King City, Ontario, Canada, assignors to Atomic Energy of Canada Limited, Ottawa, Canada
Filed July 10, 1964, Ser. No. 381,676
6 Claims. (Cl. 137—478)

This invention relates to relief valves for pressurized systems and more particularly to an anti-simmer device for use in conjunction with such a relief valve.

It has long been the practice to employ either relief valves or rupture disks in high pressure, high temperature systems to guard against undesired increases in pressure in the sytsem. For this purpose, a safety relief valve which will reset automatically after relieving the excess pressure in the system is preferred to a rupture disk which must be replaced. However, such a relief valve must be capable of functioning repeatedly and reliably at a pressure very close to the maximum pressure. Furthermore, the valve components should require a minimum of maintenance.

One main disadvantage of such relief valves is that when the system pressure reaches the point at which the pressure just balances the force exerted by the valve spring, intermittent leakage past the valve seat takes place, and the relief valve is said to be "simmering." Such leakage, although minor in terms of the quantity of fluid lost generally results in rapid erosion of the valve seat thereby necessitating frequent valve maintenance.

To overcome the above disadvantage, it is the purpose of this invention to provide means to cause the relief valve to operate within close limits thus virtually eliminating simmering and reducing the maintenance required.

A further advantage accruing from the use of this invention is that of providing a dependable relief valve to protect the system thereby making it possible to operate at maximum allowable working pressure of the system without leakage past the valve. This increase in the system pressure provides for a more economical design. In designing nuclear power plants, for example, it has been found that the present invention when attached to a standard relief valve, provides positive blow-off and reseating of the valve within a much narrower pressure range than can be obtained with commercially available relief valves. In effect, the anti-simmer device of this invention provides a preload which supplements the normal valve spring load.

When the system pressure reaches a value just below the set point of the relief valve, the preload is suddenly released thus allowing blow-off to occur with a minimum of simmering. The preload is automatically reapplied after sufficient blow-off occurs.

Accordingly, the present invention provides an anti-simmer device for use with a relief valve for a pressurized system, said device including latch means for retaining said relief valve in a closed position and means responsive to system pressure to release said latch means thereby allowing said relief valve to open.

In the drawings which illustrate an embodiment of the invention,

Figure 1:
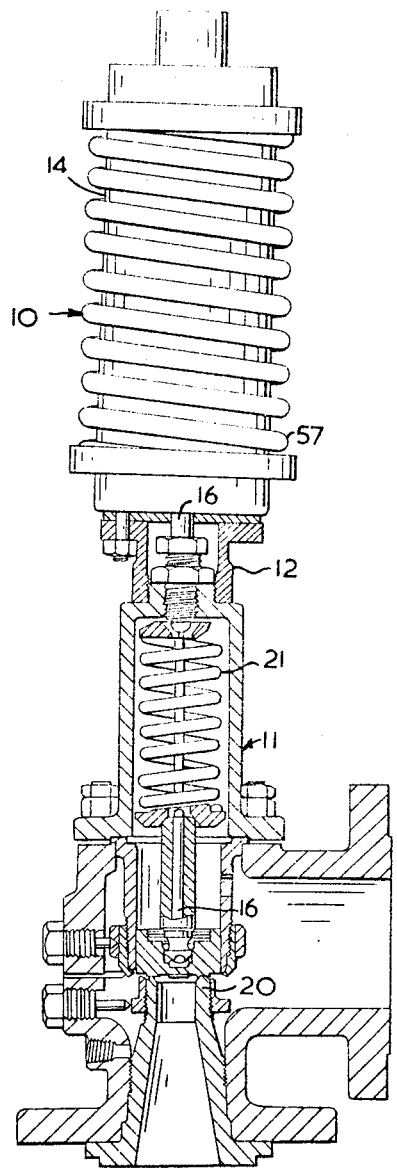
FIG. 1 is a side elevational view partly in section of the anti-simmer device of this invention in use on a relief valve.

Referring now in detail to the drawings, an anti-simmer device is shown generally at 10 in FIGURE 1. The device 10 is mounted on a relief valve 11 of the type manufactured by the Crosby Ashton Company and identified as model JB 66–9SPA. The relief valve 11 need not be described in detail, as this particular valve is not part of the invention to be described and claimed herein as the anti-simmer device 10 of this invention may be modified for use with a variety of relief valves. Briefly, the valve 11 includes a stem 16 which is urged by valve spring 21 to a normally closed position seating on valve seat 20.

In this embodiment a hollow cylindrical adapter 12 threadedly received on the upper portion of valve 11 is secured to the lower portion of the anti-simmer device 10. It would also be possible to modify the body of the relief valve 11 so that portions of the anti-simmer device 10 could be built as an integral part thereof. The device 10 includes a substantially cylindrical outer housing 14 having a centrally located aperture 15 (see FIGS. 3 and 4) through which the valve stem 16 of the valve 11 extends.

Figure 3:
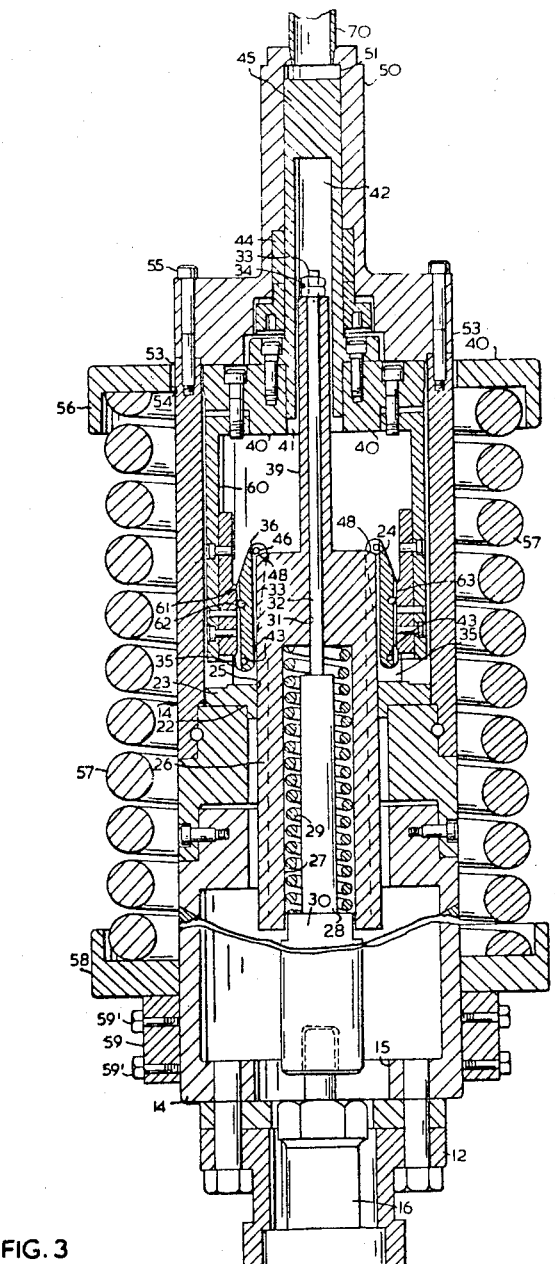
FIG. 3 is a section taken along the line 3—3 of FIG. 2 showing the mechanism of the device in the engaged position.
Figure 4:
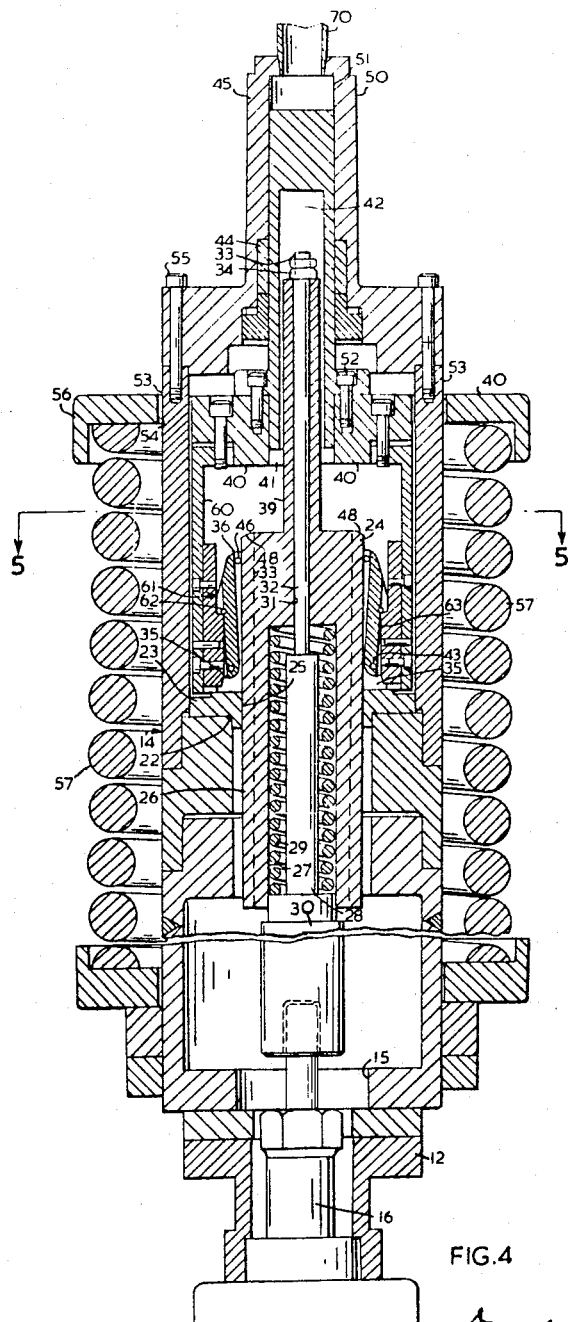
FIG. 4 is a section similar to FIG. 3 showing the mechanism of the device in the disengaged position, and FIG. 5 which is reproduced on the same sheet as FIG. 2 is a section taken along line 5—5 of FIG. 3.

As shown more clearly in FIGS. 3 and 4, the interior of the housing 14 is restricted to define a shoulder 22. A slidable member 26, which is generally cylindrical in shape, the outer periphery of which is shown in broken lines, is provided with three longitudinally extending ribs 24. (See FIG. 5.) A collar 23 is adapted loosely to surround slidable member 26 and is secured to the shoulder 22 in the housing 14. The collar 23 has a centrally located aperture 25 adapted to accommodate slidable member 26 and also three grooves 25' adapted to accommodate the ribs 24. The collar 23 is also provided with three pairs of upwardly extending projections 35 thereon to which latch members 36 are pivotally secured by means of pins 43. Each latch member 36 is adapted to co-operate with one of the ribs 24 in a manner to be described in detail below. A bore 27 in the slidable member 26 receives therein an extension 28 of the valve stem 16. A pressure spring 29 surrounding the extension 28 is also received in the bore 27 and bears at its upper end on the slidable member 26 and at its lower end and a shoulder 30 provided on the valve stem extension 28.

A counterbore 31 of reduced diameter is provided in the slidable member 26 to receive a portion 32 of the extension 28 which is also of reduced diameter and which terminates in a threaded portion 33. This threaded portion 33 of the extension 28 extends beyond the slidable member 26 and receives retaining nuts 34.

An axially slidable annular plate 40 received on the upper open end of the housing 14 has a centrally located aperture 41 through which a portion 39 of reduced diameter of the slidable member 26 extends into a chamber 42 in a hollow piston 45. The piston 45 is secured to the plate 40 by machine screws 52.

The piston 45 is, in turn, slidable within a bore 51 of an end bell or cap 50 which is fixedly secured to the open end of housing 14. A seal 44 is provided in the bore 51.

Figure 2:
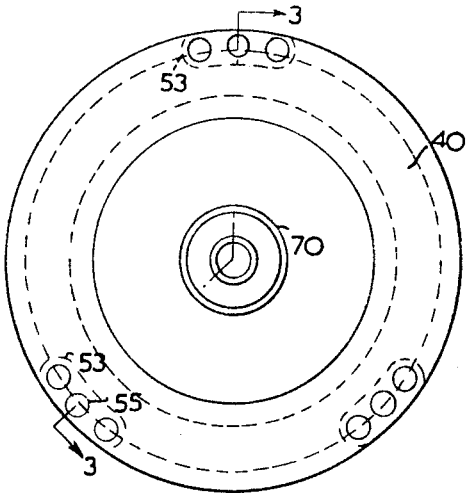
FIGURE 2 is a top-plan view of the device of FIG. 1.

As shown in FIGS. 2, 3 and 4, projecting portions 53 of the cylinder 15 extend through apertures 54 in the plate 40 and the end bell 50 is secured thereto by suitable machine screws 55.

The plate 40 extends outwardly and downwardly to define a peripheral flange 56, to receive an upper end of helical return spring 57. The lower end of the return spring 57 is received in a similar flange 58 secured to the housing 14 at the lower end thereof. Limited axial movement of the plate 40 is, therefore, facilitated. The return spring normally urges the plate 40 upwardly as viewed in FIG. 3. The flange 58 is prevented from downward movement by a collar 59 slidably received on the body 14 and adjustable axially with respect thereto. The collar 59 is releasably secured in a selected position on the body 14 by set screws 59' provided thereon in a conventional manner. The preload of the spring 57 is thereby varied to preset the pressure release point of the system.

Secured to the plate 40 and adapted to be slidably received in the housing 14 is a cylindrical sleeve 60. Cam members 61 are secured to the interior of the sleeve 60, so that each cam 61 is adapted to co-operate with an associated one of the latch members 36.

In the embodiment illustrated, there are three latch members 36, three cams 61 and three ribs 24. However, the number of latch members 36 and associated elements may vary. It has been found, for example, that one latch mechanism is sufficient. Accordingly, only one of latch members 36 and its associated elements will be described in detail.

Figure 5:
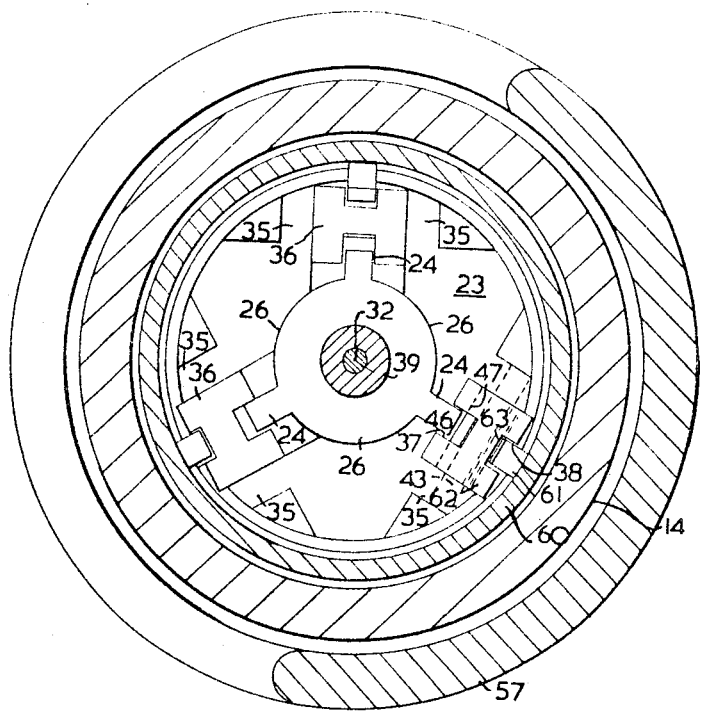

As shown in FIG. 5, the latch member 36 is substantially rectangular in cross-section and is provided with grooves 37 and 38 in mutually opposed side walls thereof. The groove 37 is adapted to receive the rib 24 of the slidable member 26 and the groove 38 is adapted to receive the cam member 61. The latch member 36 is also provided with a first transverse roller 46 received in suitable apertures 47 at the upper end thereof. The roller 46 is adapted to contact a chamfered upper edge 48 of the rib 24. A second transverse roller 62 received in a suitable aperture adjacent the mid-section of the latch 36 is adapted to contact the raised portion 63 of the cam 61.

In operation, when the anti-simmer device 10 has been installed on a relief valve 11, the valve stem extension 28 engages the valve stem 16 and a conduit 70 is connected between the end cap 51 and the line of the pressurized system (not shown). The latch member 36 will then be in engagement with the slidable member 26 as shown in FIG. 3. It will be appreciated that the extra axial load which the device 10 imparts to the extension 28 of the valve stem 16 comes from the preload built into the spring 29. The pressure spring 29 is, in turn, urged against the valve stem extension 28 by the slidable member 26. The slidable member 26 maintains its position relative to the valve stem 28 due to the roller 46 engaging the chamfered edge 48 of the rib 24. The axial relation of the roller 46 with respect to the chamfered edge 48 of the rib 24 is a critical dimension which can be preset by adjusting retaining nuts 34.

The latch 36 is prevented from being pushed out of engagement with the edge 48 of the rib 24 by the raised portion 63 of the cam 61 engaging the second roller 62. The cam 61 which is supported by the sleeve 60 is axially movable and, therefore, must also be maintained in operative engagement with the second roller 62. This is accomplished by the return spring 57 which urges the plate 40 and the attached sleeve 60 upwardly.

When the system pressure approaches the set point of the relief valve 11, the system pressure being supplied to the piston 45 through the conduit 70, will cause the piston 45 to move downwardly as viewed in FIGURE 4. This downward movement of the piston 45 causes similar movement of the attached slidable plate 40 and the cylindrical sleeve 60 secured thereto. The cam 61 secured to the sleeve 60 then moves downwardly so that the raised portion 63 is no longer in contact with the second roller 62, thus allowing the upper portion of the latch member 36 to be pivoted radially outwardly.

Actual pivotal movement of the latch member 36, however, takes place when the relief valve 11 reaches its set point and the valve stem 16, the extension 28 and the slidable member 26 move upwardly, thereby causing the first roller 46 to be cammed by the chamfered edge 48 of the rib 24. The rib 24 thus disengages from the roller 46 and is then free to move upwardly a sufficient amount to allow the relief valve 11 to open fully.

Downward movement of the plate 40 causes the return spring 57 to be compressed. When the relief valve 11 is blown off so that pressure in the system has fallen below the set point of the valve, the system pressure being supplied through conduit 70 to piston 45 will no longer be sufficient to hold the plate 40 and the associated sleeve 60 and the cam 61 in the "down" position because of the force exerted by the return spring 57. The slidable member 26 having moved downwardly as the relief valve 11 closes, is now in a position where the rib 24 will be engaged by the roller 46. Thus, the upward movement of the cam 61 causes the raise portion 63 of the cam to engage the second roller 62 thereby locking the latch member 36 in operative relation to the slidable member 26.

We claim:
1. In a pressurized system having a relief valve including a stem and a first resilient means biasing it toward a normally closed position, said valve being adapted to open when pressure in said system reaches a selected value and close when pressure falls below the selected value; an anti-simmer device mounted rigidly with respect to said relief valve and having a first member selectively movable normally locking said valve in a selected position, said device including a second resilient means interposed between said first member and said valve normally urging said valve to a closed position, latch means operated by a second member into locking engagement with said first member to maintain said valve in said closed condition, means responsive to system pressure to release said latch means when said selected system pressure is reached and means to cause said pressure responsive means to cause said latch means to re-engage aid valve stem when pressure in said system falls below the selected value.

2. An anti-simmer device for use with a pressure relief valve of a pressurized system, said valve having a valve stem and a spring biasing said valve stem toward a closed position, said anti-simmer device comprising a housing, a sleeve slidable in said housing, a slidable member in said sleeve, spring means interposed between said slidable member and said valve stem urging said stem of said relief valve to a normally closed position, pressure responsive means connected to said sleeve, latch means on said housing engaging said slidable member to retain said member in a fixed position relative to the housing, a return spring urging said sleeve axially away from said valve, and means on said sleeve for releasing said latch means whereby a selected system pressure causes said pressure responsive means to move said sleeve, against the urging of said return spring, toward said relief valve to release said latch means thereby allowing said slidable member and said valve stem slidably to move to open said relief valve, said return spring causing said sleeve to move axially away from said valve when the pressure in the system falls below the selected pressure to cause said latch means to re-engage said slidable member.

3. An anti-simmer device for use with a pressure relief valve of a pressurized system, said valve having a valve stem and a spring biasing said valve stem toward a closed position, said anti-simmer device comprising a housing, a sleeve slidable in said housing, a slidable member in said sleeve, spring means interposed between said slidable member and said valve stem urging said stem of said relief valve to a normally closed position, a piston responsive to system pressure connected to said sleeve, latch means on said housing engaging said slidable member to retain said member in a fixed position relative to the housing, a return spring urging said sleeve axially away from said valve, and means on said sleeve for releasing said latch means whereby a selected system pressure causes said piston to move said sleeve, against the urging of said return spring, toward said relief valve to release said latch means thereby allowing said slidable member and said valve stem slidably to move to open said relief valve, said return spring causing said sleeve to move axially away from said valve when the pressure in the system falls below the selected pressure to cause said latch means to re-engage said slidable member.

4. An anti-simmer device for use with a pressure relief valve of a pressurized system, said valve having a valve stem and a spring biasing said valve stem toward a closed position, said anti-simmer device comprising a housing, a sleeve slidable in said housing, a slidable member in said sleeve, spring means interposed between said slidable member and said valve stem urging said stem of said relief valve to a normally closed position, adjustable means for selectively moving said slidable member axially relative to said stem thereby compressing said spring means, pressure responsive means connected to said sleeve, latch means on said housing engaging said slidable member to retain said member in a fixed position relative to the housing, a return spring urging said sleeve axially away from said valve, and means on said sleeve for releasing said latch means whereby a selected system pressure causes said pressure responsive means to move said sleeve, against the urging of said return spring, toward said relief valve to release said latch means, thereby allowing said slidable member and said valve stem slidably to move to open said relief valve, said return spring causing said sleeve to move axially away from said valve when the pressure in the system falls below the selected pressure to cause said latch means to re-engage said slidable member.

5. An anti-simmer device as claimed in claim 4 wherein said adjustable means includes an axial bore in said slidable member, said spring means being a helical spring in said bore having its one end bearing against a restricted portion of said bore and its other end bearing against an extension provided on said valve stem, said extension on said valve stem including an elongated member extending through the restricted portion of said bore, a free end of said elongated member having a threaded portion to engage a nut which bears on the associated end of said slidable member.

6. An anti-simmer device as claimed in claim 2 wherein said return spring bears at its one end against an axially adjustable collar.

References Cited by the Examiner

FOREIGN PATENTS 680,501 2/1964 Canada.
597,161 5/1934 Germany.

M. CARY NELSON, *Primary Examiner.*

MARTIN P. SCHWADRON, *Examiner.*

R. J. MILLER, *Assistant Examiner.*